(12) United States Patent  (10) Patent No.: US 8,209,912 B2
Hargreaves et al.  (45) Date of Patent: Jul. 3, 2012

(54) HORTICULTURE LIGHT FIXTURE WITH GLASS RETENTION RAILS

(75) Inventors: Craig Hargreaves, Vancouver, WA (US); Darrin McDonald, Vancouver, WA (US)

(73) Assignee: IP Holdings, LLC, Vancouver, WA (US)

( * ) Notice: Subject to any disclaimer, the term of this patent is extended or adjusted under 35 U.S.C. 154(b) by 730 days.

(21) Appl. No.: 12/387,432

(22) Filed: May 4, 2009

(65) Prior Publication Data

US 2010/0277929 A1 Nov. 4, 2010

(51) Int. Cl.
*F21V 29/00* (2006.01)
(52) U.S. Cl. ............... 52/28; 52/200; 52/656.6; 362/362
(58) Field of Classification Search .............. 52/28, 200, 52/656.5, 656.6; 362/362, 374, 375
See application file for complete search history.

(56) References Cited

U.S. PATENT DOCUMENTS

| | | | | |
|---|---|---|---|---|
| 2,701,840 | A | * | 2/1955 | Carlson .......................... 362/375 |
| 2,791,681 | A | * | 5/1957 | Evans et al. .................... 362/374 |
| 3,019,333 | A | * | 1/1962 | Pascucci ........................ 362/374 |
| 4,504,888 | A | * | 3/1985 | Rosenthal ...................... 362/375 |
| 4,713,916 | A | * | 12/1987 | Brooks, Jr. ......................... 52/28 |
| 6,247,830 | B1 | | 6/2001 | Winnett |
| 6,267,483 | B1 | | 7/2001 | Hembry |
| 6,595,662 | B2 | * | 7/2003 | Wardenburg ................. 362/362 |

OTHER PUBLICATIONS

U.S. Appl. No. 11/679,140, filed Mar. 2009, Hargreaves.

* cited by examiner

*Primary Examiner* — Basil Katcheves
*Assistant Examiner* — Matthew J Smith
(74) *Attorney, Agent, or Firm* — Robert J. Ireland

(57) ABSTRACT

A horticulture light system comprising a housing, glass retention rails, gasket, glass sheet, and threaded fasteners. The housing constructed of no more than three portions of sheet metal, defining an interior space therein and having an open end towards the plants, the housing interior space constructed and arranged for containing a grow lamp and reflector to project a pattern of light out the open end of the housing at the plants, the open end including a rectangular sealing face for mating with the gasket, the gasket sealing the glass surface to the rectangular sealing face when compressed by the glass retention rails. The glass retention rails also constructed from sheet metal, easily formed into a L shape, attached by common threaded screws, and as tightened, compressively secure the glass to the gasket and housing. Loosening the threaded screws removes the compressive force, unsealing the glass from the housing, making for easy glass removal, facilitating maintenance and cleaning.

6 Claims, 8 Drawing Sheets

HORTICULTURE LIGHT FIXTURE WITH GLASS RETENTION RAILS

CROSS REFERENCES TO RELATED APPLICATIONS

NONE

STATEMENT REGARDING FEDERALLY SPONSORED RESEARCH OR DEVELOPMENT

This invention is not the product of any Federally Sponsored Research or Development.

REFERENCE TO MICROFICHE APPENDIX

Not Applicable

BACKGROUND OF THE INVENTION

1. Technical Field

The present device relates generally to horticultural lighting fixture used for growing plants in controlled environments.

2. Discussion of Related Art

Indoor gardens, green houses, hydroponics systems, and isolated carbon dioxide growing chambers demand careful regulation of temperature, light, hydration, nutrients, and humidity. In these controlled environments, one of the major challenges is providing adequate light intensity, while efficiently and effectively removing the heat generated by the light source. A second major challenge relates to the manufacturing of the horticulture fixture in an economical way, utilizing inexpensive materials and manufacturing processes. Horticulture lighting systems depend on grow lamps as a primary light source. Commonly used grow lamps are high pressure sodium and metal halide. These grow lamps get exceptionally hot when confined in a horticulture lighting fixture. The heat generated may curl new growth on plants, dry out the soil or planting medium, and if the heat is not dissipated, the grow lamp will have a reduced life span. These undesirable effects reduce yields and increase operational costs.

Several air cooled horticulture light fixture designs incorporate sheet metal enclosures in combination with a transparent shield or glass between the grow lamp and the developing plants, sealing the heat generated from the lamp while allowing the desired light to pass. Some fixtures even benefit from forced air cooling wherein a fan blows cooling atmosphere through the fixture exhausting the heated air out of the growing environment, and away from plants.

This problem of energy being absorbed and then radiated was addressed by U.S. Pat. No. 6,595,662 issued in July 2003 to Wardenburg disclosing an air cooled double walled fixture wherein cooling air was introduced via conduit on one end and exhausted out the other side, and a transparent portion was located between the grow lamp and the plants allowing for light to pass while isolating the lamp and it's heat from the growing environment. Wardenburg did not disclose or teach the fixture having glass retention rails for removably engaging and sealing glass to the bottom of the fixture allowing for easy cleaning and maintenance.

U.S. Pat. No. 6,267,483 issued in July 2001 to Hembery discloses a straight and continuous channel of air flow through a transparent tube. The Hembery device isolates the grow lamp from the growing plants by centering the grow lamp within the transparent tube. Free flowing air enters one end of the fixture and free flows out the other side. The Hembery device absolutely depends on a transparent tube, and the transparent material of choice is borosilicate glass that is heavy and expensive. Hembery fails to teach construction from low cost material or manufacturing method such as sheet metal and the efficient process of forming and shaping sheet metal.

U.S. Pat. No. 6,247,830 issued in June 2001 to Winnett et al. discloses a forced air transparent tube fixture that senses the temperature of the fixture and shuts the grow lamp down if the temperature exceeds a predetermined maximum safe operating level. The Winnett device also relies on a transparent tube that must withstand high temperatures which is expensive and fails to teach the use of inexpensive sheet metal and sheet metal processes.

Not one of the above discussed inventions, taken either singularly or in combination, teach the instant invention as claimed. What is desired is a horticulture light fixture primarily constructed from inexpensive sheet metal formed by efficient sheet metal processes, having a glass retention structure that provides easy glass removal for cleaning and fixture maintenance, while said glass retention structure provides positive compressive force sealing the glass to the fixture via gasket, thus isolating the growing plants from the generation of grow lamp heat.

PRIOR ART

| U.S. Patent Reference Documents: | | |
| --- | --- | --- |
| Application 11/679,140 | March 2009 | Hargreaves |
| 6,595,662 | July 2003 | Wardenburg |
| 6,267,483 | July 2001 | Hembry |
| 6,247,830 | June 2001 | Winnett et al. |
| D400,289 | October 1998 | Wardenburg et al. |
| 5,702,179 | December 1997 | Sidwell |
| 5,621,267 | April 1997 | Shaffner et al. |
| 4,078,169 | March 1978 | Armstrong |
| 4,037,096 | July 1977 | Brendgord et al. |
| 3,825,741 | July 1974 | Morton et al. |

OBJECTS AND ADVANTAGES

There are several objects and advantages of the present device:
a) to provide a horticulture light fixture able to sealingly isolate the grow lamp heat away from plants, constructed out of inexpensive sheet metal, utilizing an inexpensive flat glass sheet, secured via sheet metal retention structure;
b) a simple and elegant horticulture housing constructed from no more than three sheet metal portions;
c) a sturdy rail structure constructed from efficient punching and forming of sheet metal that when attached to the housing, provides adequate compressive force, sealingly securing the glass;
d) to provide a glass retention structure able to sealingly secure the glass, while facilitating simple and easy cleaning and maintenance.
e) to provide a sheet metal alternative to using more expensive materials and parts such as borosilicate glass transparent tubes, hinges and other component parts.

Still further objects and advantages will become apparent from considerations of the ensuing description and drawings.

SUMMARY

In accordance with the present device, a horticulture light system comprising a housing, glass retention rails, gasket, flat glass sheet, and fasteners. The housing defining an interior space therein and having an open end towards the plants, the housing interior space constructed and arranged for containing a grow lamp and reflector to project a pattern of light out the open end of the housing at the plants, the open end including a rectangular sealing face for mating with the gasket, the gasket sealing the glass surface to the rectangular sealing face when compressed by the glass retention rails. The glass retention rails also constructed from sheet metal, easily formed into a L shape, attached by common threaded screws, and as tightened, compressively secure the glass to the gasket and housing. Loosening the threaded screws removes the compressive force, unsealing the glass from the housing, making for easy glass removal, facilitating maintenance and cleaning.

TABLE OF NUMERIC IDENTIFIERS

| Numeric | Element |
| --- | --- |
| 100 | Housing |
| 101 | Interior Space |
| 102 | Open Side |
| 120 | Center Portion |
| 130 | First Portion |
| 140 | Second Portion |
| 150 | Left Lip Bend |
| 160 | Right Lip Bend |
| 170 | Possible Air Duct Location |
| 180 | Left Side |
| 190 | Right Side |
| 200 | Top Side |
| 210 | Interior space |
| 230 | Sealing Face |
| 240 | Sheet of Glass |
| 250 | Inward Glass Surface |
| 260 | Outward Glass Surface |
| 270 | Threaded Hole |
| 275 | Through Hole |
| 280 | First Tab |
| 290 | Second Tab |
| 300 | Third Tab |
| 310 | Fourth Tab |
| 320 | First End |
| 330 | Second End |
| 340 | Bottom Edge |
| 350 | Exposed Edges |
| 360 | Gasket |
| 370 | Top Gasket Surface |
| 380 | Bottom Gasket Surface |
| 390 | Sealing Mates |
| 400 | First Glass Retention Rail |
| 410 | Second Glass Retention Rail |
| 420 | Third Glass Retention Rail |
| 430 | Fourth Glass Retention Rail |
| 440 | L-Shape |
| 460 | Angle |
| 470 | Threaded Fastener |
| 475 | Threaded Thumb Fastener |
| 480 | Adhesive |
| 500 | Style Line |
| 510 | Lip |
| 600 | Internal Fold Seams |

TABLE OF NUMERIC IDENTIFIERS

| Numeric | Element |
| --- | --- |
| 700 | Sheet of Glass |
| 700 | Sheet of Glass |

DESCRIPTION OF THE PREFERRED EMBODIMENT

Figure 1:
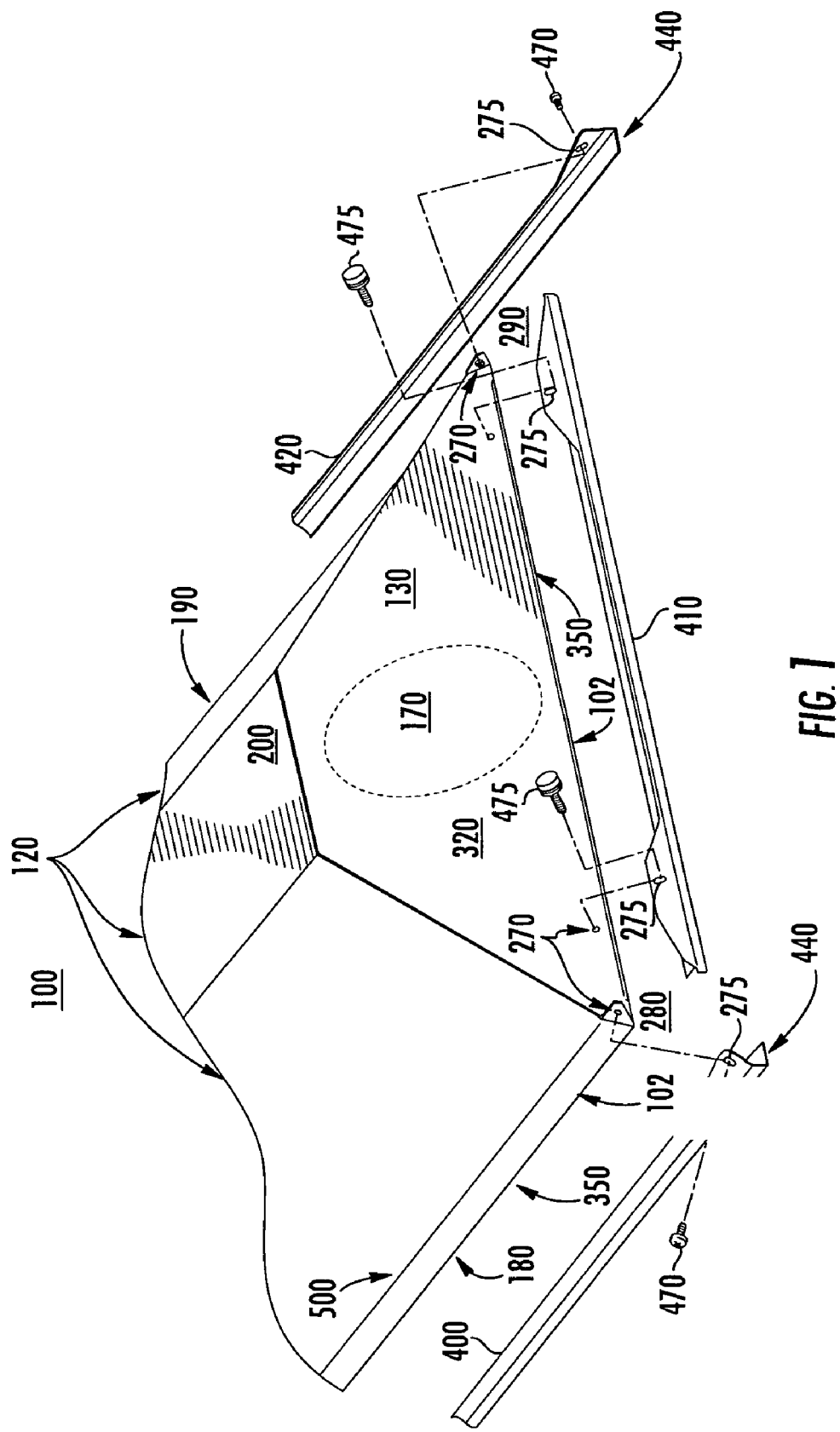
FIG. 1 is a perspective exploded front view of one embodiment of the Horticulture Light Fixture with Glass Retention Rails.

Referring now to the drawings, and particularly to FIGS. 1-8, a preferred embodiment of the present device is shown, illustrating the Horticulture Light Fixture with Glass Retention Rails. The exemplary embodiments according to the present device are illustrated with those components necessary to demonstrate the inventive design, enable comprehension, and facilitate understanding. The embodiment shown, sealingly secures the glass sheet while allowing for easy removal for cleaning and maintenance. Many of the non-novel, but necessary for operation elements like the electrical and mechanical aspects for attaching, powering, and implementing are not present as they are commonly used and known in the art. For example, a similar Horticulture Light Fixture described in application Ser. No. 11/679,140 of Hargreaves is of the same functional characteristics as the present invention, but without the glass retention feature. The electrical service connection of 110 volts and 220 volts, socket configuration, and reflective insert is known by one of normal skill in the art, but not specifically mentioned in this application. Another application of the herein described feature of glass retention would be the double-walled fixture described in U.S. Pat. No. 6,595,662 Wardenburg for example. The current invention is applicable to all horticulture light fixtures that could benefit from a glass retention feature herein described.

Description FIG. 1:

FIG. 1 is a perspective exploded front view of one embodiment of the Horticulture Light Fixture with Glass Retention Rails. The housing 100 is constructed from three portions, two of which are shown in FIG. 1, the center portion 120 and the first portion 130 with the second portion 140 not shown in FIG. 1, but shown in subsequent FIGs. The housing 100 defines an interior space 101 shown in subsequent FIGs, and open side 102 also illustrated in FIGS. 5, 6, and 8.

In the illustrated embodiment in FIG. 1, the first portion 130 constructed from one continuous sheet of metal having two threaded holes 270 including a first tab 290 formed to match the angle of the right side 190 and a second tab 280 formed to match the angle of the left side 180, each first tab 290 and second tab 280 having a threaded hole 270.

Figure 5:
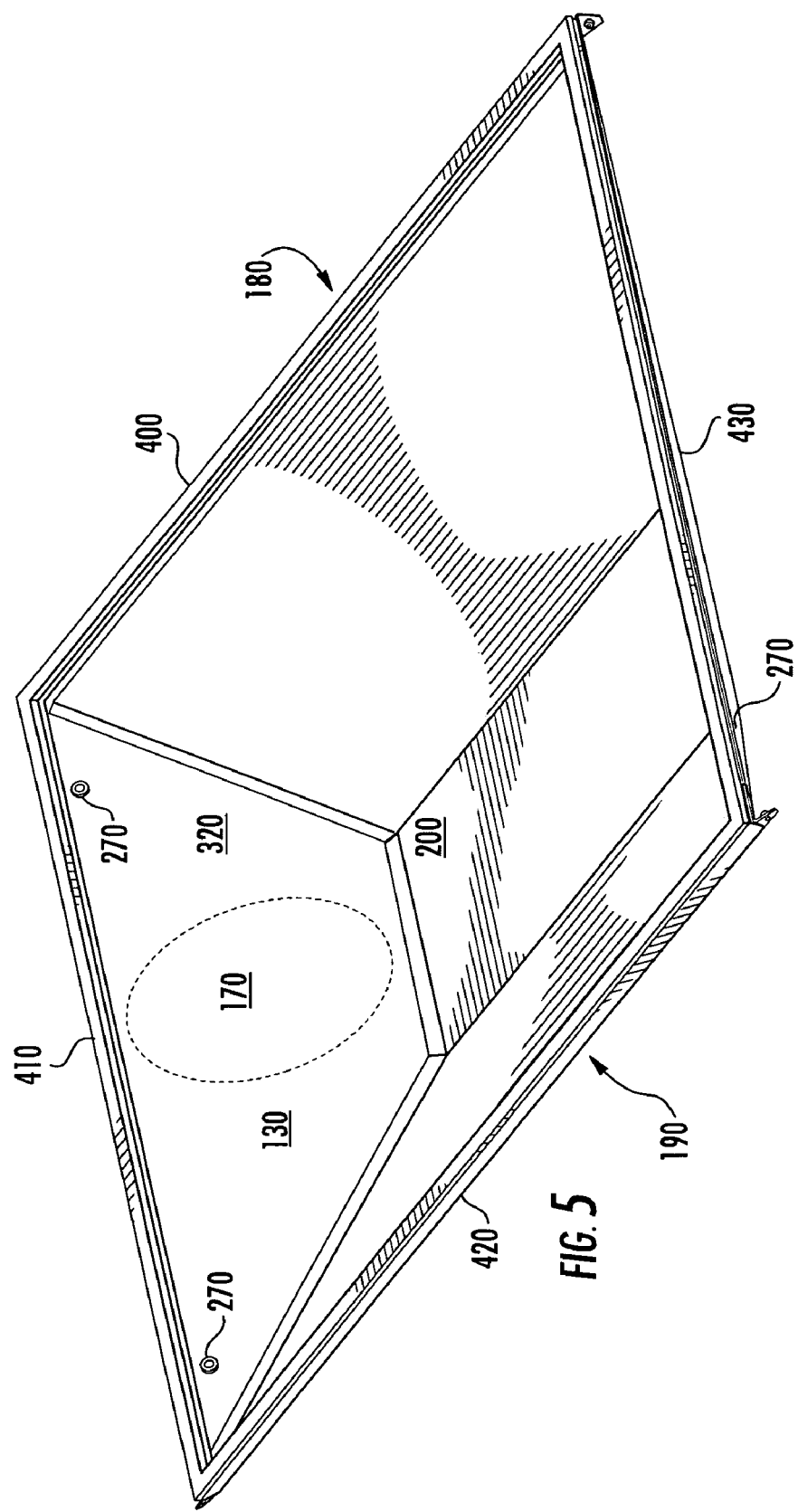
FIG. 5 is a bottom side view of the embodiment of the embodiment housing as shown in FIG. 1.
Figure 6:
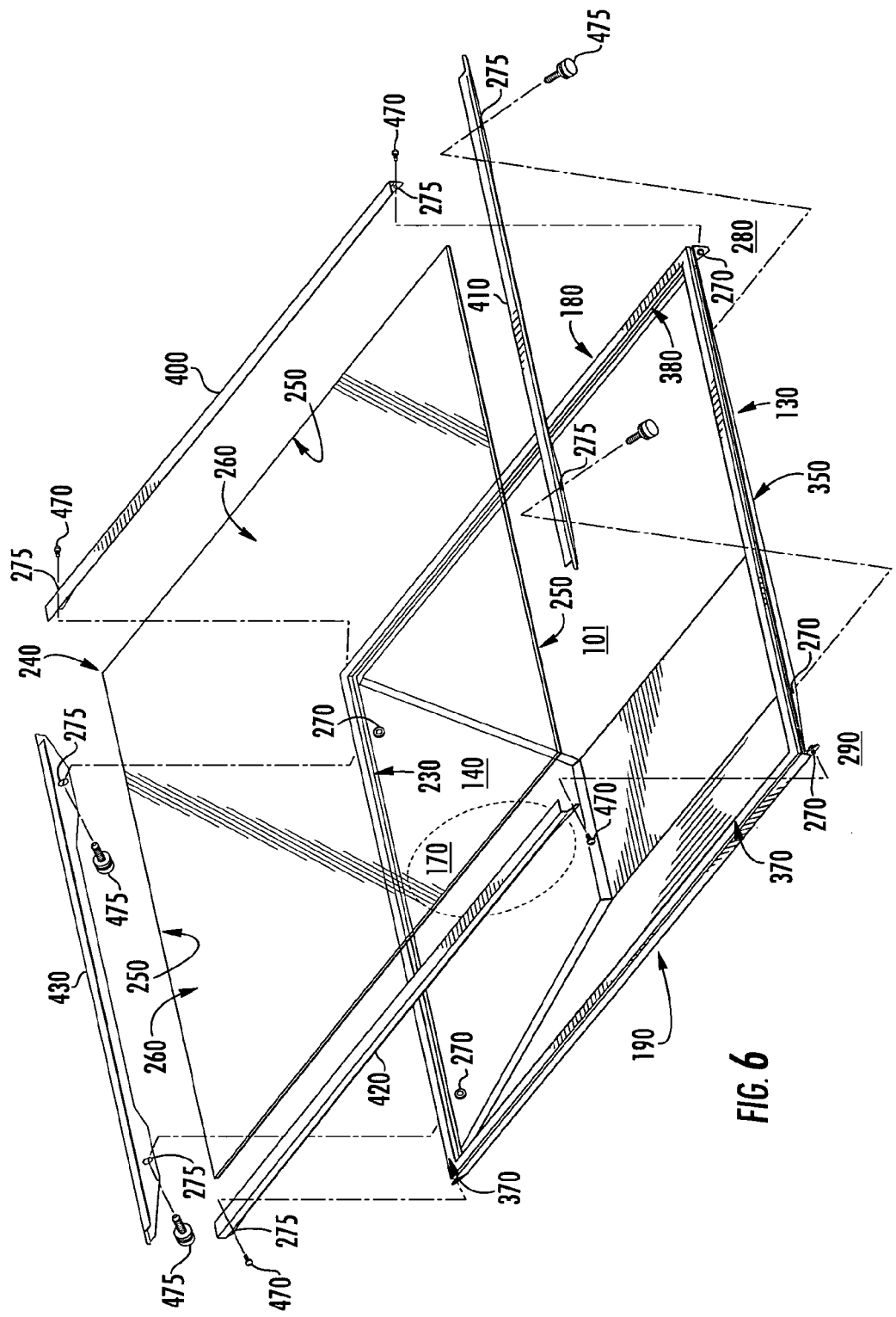
FIG. 6 is a component exploded view of the housing, glass retention rails, threaded fasteners and the flat sheet of glass of the embodiment as shown in FIG. 1.

The center portion 120 constructed from a continuous sheet of metal, forming the left side 180, right side 190, and top side 200 of the housing 100, in connection with the first portion 130 forming the first end 320, and the second portion 140 forming the second end 330 (Not shown in FIG. 1, but shown in subsequent FIGS. 2-8), leaving the open side 102 at the bottom with the exposed edges 350 of the center portion 120, first portion 130, and second portion 140 defining the sealing face 390 shown in FIG. 6. The fold line 500 is shown along the left side 180 for the purpose of illustrating the present invention, but is not required for the invention;

FIG. 1 illustrates a first glass retention rail 400, second glass retention rail 410, and third glass retention rail 420, each constructed having a general profile of an L-Shape 440. The first portion 130 constructed from one continuous sheet of metal having two threaded holes 270 including a first tab 290 formed to match the angle of the right side 190 and a second tab 280 formed to match the angle of the left side 180, each first tab 280 and second tab 290 having a threaded hole 275.

FIG. 1 shows the embodiment having a possible air duct location 170, wherein cooling atmosphere could be circulated through the fixture. This possible air duct location 170 is shown here to demonstrate the diversity of different types of horticulture light fixtures that could benefit from this innovative glass retention structure.

The connecting the glass retention rails is demonstrated in FIG. 1., the second glass retention rail 410, fixates to the housing 100 shown using thumb fasteners 475 passing within through holes 275 in second glass retention rail 410, securing by screwing into the threaded holes 270 located in the first portion 130. The first glass retention rail 400 secures in a similar manner but along the left side 180 by threaded fastener 470 wherein the threaded fastener 470 passes within the through holes 275 of the first glass retention rail 400, securing by screwing into the threaded hole 270 located in the first tab 280. The third glass retention rail 420 secures in a very similar manner but along the right side 190 by threaded fastener 470 wherein the threaded fastener 470 passes within the through hole 275 of the third glass retention rail 420, securing by screwing into the threaded hole 270 located in the second tab 290. The opposing second portion 140 is not shown in FIG. 1, but is illustrated in subsequent FIGs having similar connection methods of the fourth glass retention rail 430 shown in FIG. 2-8.

The general L-Shape 440 of the end profiles of the glass retention rails 400, 410, 420, 430 are constructed and arranged having the upper long vertical L-Shape 440 portion matching the side on which the rail attaches, with the lower L-Shape 440 portion being parallel to the exposed edges 350.

Specifically the first glass retention rail 400 having a length matching the bottom exposed edge 350 of the left side 180, and formed into an L-shape 440 having the bottom of the L parallel with the open side 102 shown in FIG. 6, the bottom of the L-Shape 440 also being parallel with the exposed edge 350, of the left side 180. The first glass retention rail 400 having the top of the general L-Shape 440 matching the angle of the left side 180. The second glass retention rail 410 having a length matching the exposed edge 350 of the first portion 130, having two through holes 275 matching position of the first portion 130 threaded holes 270. The second glass retention rail 410 formed into an L-shape 440 having the bottom of the L-shape 440 parallel with the open side 102 shown in FIG. 6, also being parallel with the bottom exposed edge 350, of the first portion 130. The second glass retention rail 410 having the top of the general L-shape 440 matching the angle of the first portion 130.

The third glass retention rail 420 having a length matching the bottom exposed edge 350 of the right side 190, and formed into an L-shape 440 having the bottom of the L parallel with the open side 102 shown in FIG. 6, the bottom of the L-Shape 440 also being parallel with the bottom exposed edge 350, of the right side 190. The third glass retention rail 420 having the top of the general L-shape 440 matching the angle of the right side 190.

The fourth glass retention rail 430 is not shown in FIG. 1, but is shown in subsequent FIGs. having similar attachment to the housing 100.

Figure 2:
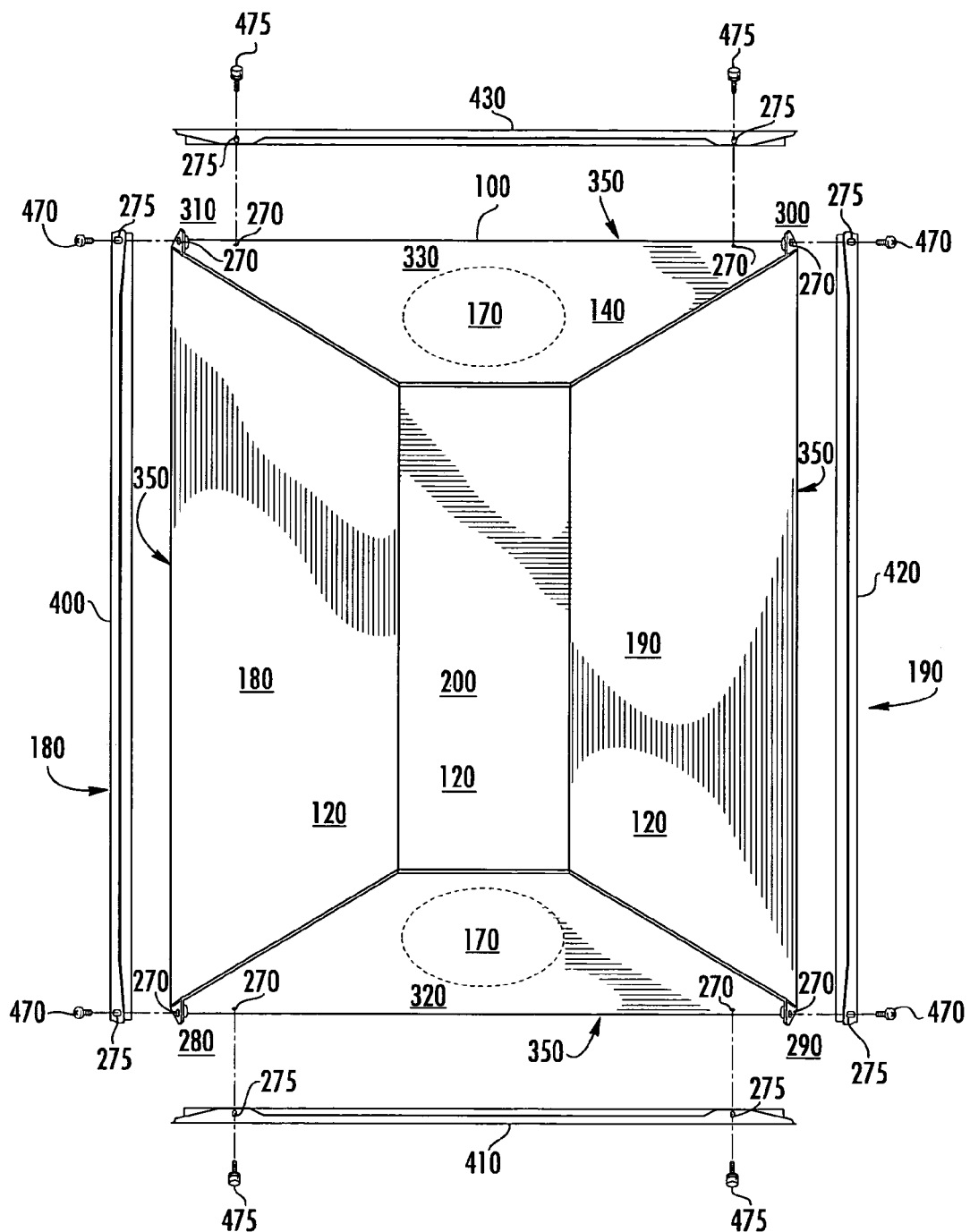
FIG. 2 is a top side exploded view of the embodiment as shown in FIG. 1.

FIG. 2 is a top side exploded view of the embodiment as shown in FIG. 1 illustrating how all of the glass retention rails 400, 410, 420, and 430 attach to the housing 100. The first portion 130 constructed from one continuous sheet of metal having two threaded holes 270 including a first tab 280 formed to match the angle of the left side 180 and a second tab 290 formed to match the angle of the right side 190, each first tab 280 and second tab 290 having a threaded hole 275. The second portion 140 constructed from one continuous sheet of metal having two threaded holes 270 including a third tab 300 and fourth tab 310, the third tab 300 formed to match the angle of the right side 190 and the fourth tab 310 formed to match the angle of the left side 180, each third tab 300 and fourth tab 310 having a threaded hole 270. The housing 100 constructed from the center portion 120, the first portion 130, and a second portion 140, the center portion 120 making up the top side 200, left side 180, and right side 190.

The process of connecting the glass retention rails is demonstrated in FIG. 2. from a top down perspective, specifically the second glass retention rail 410, fixates to the housing 100 as shown using thumb fasteners 475 passing within through hole 275 in second glass retention rail 410, secured by screwing into the threaded holes 270 located in the first portion 130. The first glass retention rail 400 secures in a similar manner but along the left side 180 by threaded fastener 470 wherein the threaded fastener 470 passes within the through hole 275 of the first glass retention rail 400, securing by screwing into the threaded hole 270 located in the second tab 290. The third glass retention rail 420 secures in a mirror manner but along the right side 190 by threaded fastener 470 wherein the threaded fastener 470 passes within the through hole 275 of the third glass retention rail 420, securing by screwing into the threaded hole 270 located in the first tab 280. The fourth glass retention rail 430 mirrors attachment to the second glass retention rail 410, just on opposing second portion 140, specifically the fourth glass retention rail 430, fixates to the housing 100 as shown using thumb fasteners 475 passing within through hole 275 in fourth glass retention rail 430, securing by screwing into the threaded holes 270 located in the second portion 140. The use of a threaded fastener 470 or a thumb fastener 475 is a distinction without difference, simply showed as two options for the currently displayed embodiment.

Figure 3:
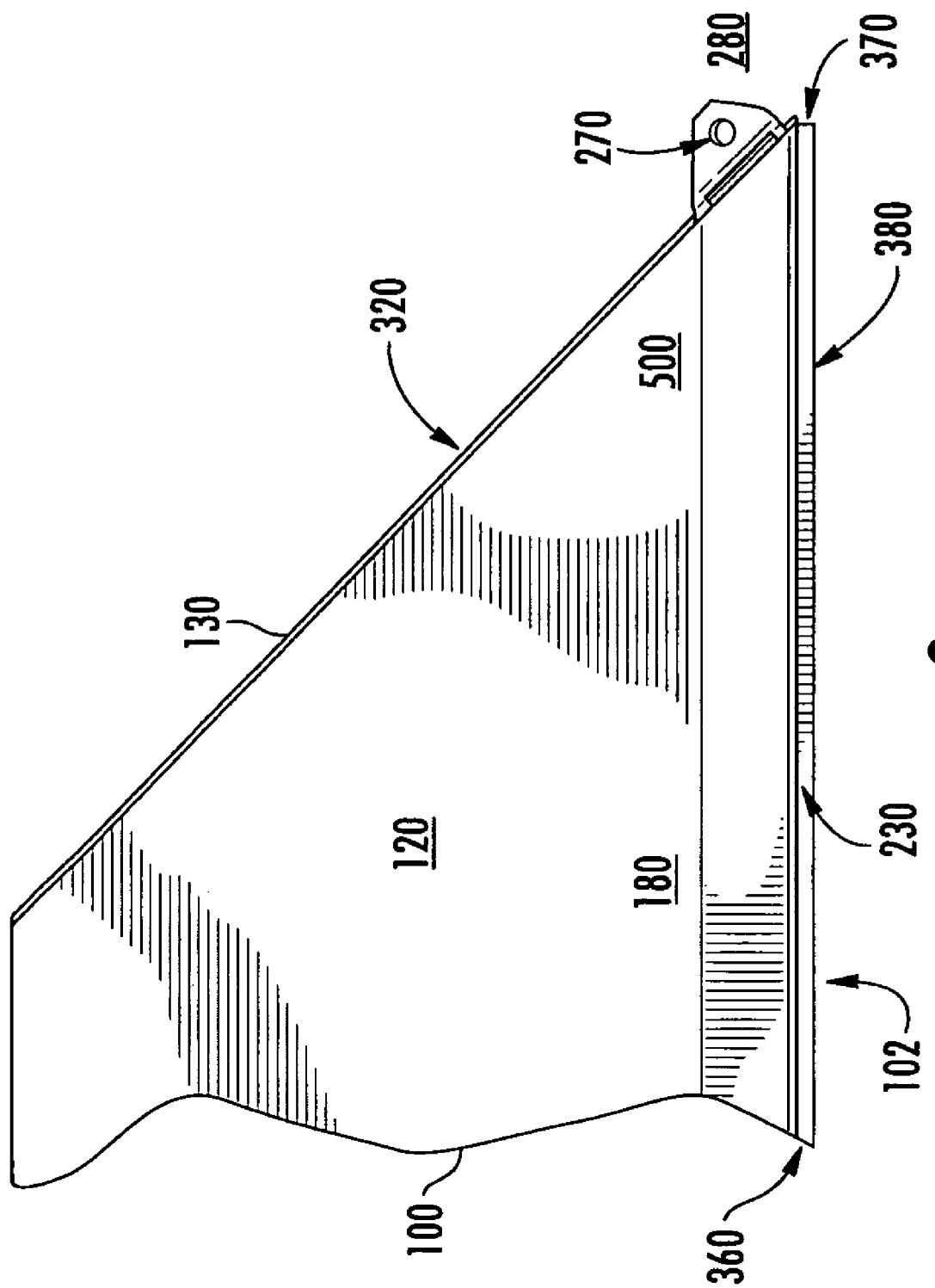
FIG. 3 is a left side close up view of the embodiment housing, as shown in FIG. 1.
Figure 4:
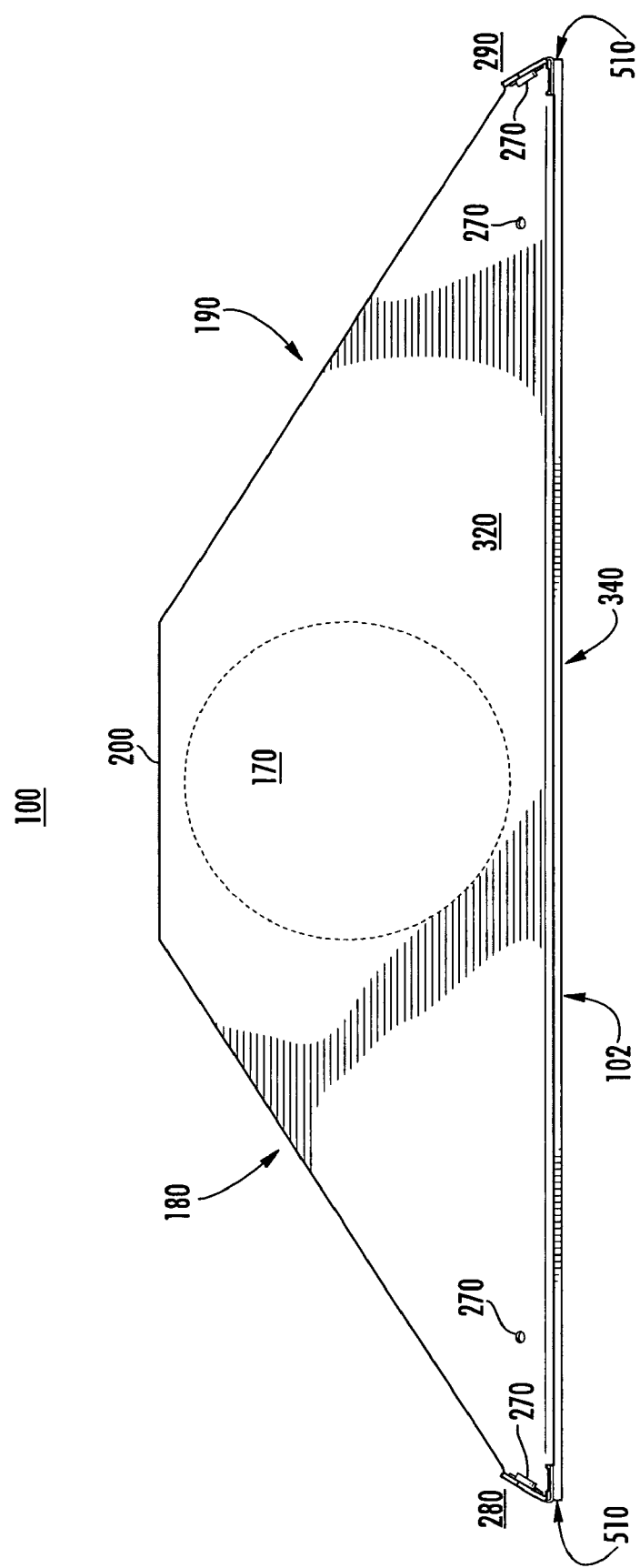
FIG. 4 is a back side view of the embodiment housing as shown in FIG. 1.

FIG. 3 is a left side close up view of the embodiment housing 100, as shown in FIG. 1. FIG. 3 provides an up close view of the first tab 280, as the first tab 280 is formed out of the same continuous sheet of metal as the first portion 130. The threaded hole 270 facilitates fixation of the first glass retention rail 400. This left side view further demonstrates the gasket 360 having a top gasket surface 370 and a bottom gasket surface 380 said top gasket surface 370 being against the sealing face 230 which is parallel running with the exposed edge 350 of the right side 180. The bend line 500 shown across the right side 180 is shown for this embodiment where the angle of the right side 180 changes at the bend line 500 for the fixture shape. This bend line 500 does not need to be present and is included for the limited purpose to describe the present embodiment style lines. The left side 180 and right side 190 could continue at the upper angle FIG. 4 illustrates the first end 320 of the housing 100. The second end 330 is a mirror image of the first end 320 shown here in this FIG. 4. The possible air duct location 170 is approximately centered which is the preferred location. The first tab 280 protrudes out matching the angle of the left side 180, and second tab 290 protrudes out matching the angle of the right side 190.

Lip 510 is shown in FIG. 4 to demonstrate another possible embodiment wherein only two glass retention rails are used rather than four, having the lip 510 square the glass to the housing 100 reducing the need for four glass retention rails to two, one on the right side 190 and one on the left side 180. Whether two rails are used or four depends on the size and weight of the glass sheet 700 shown in the other FIGs. The alternate two rail embodiment works best with rectangular housings 100 when the first end 320 and second end 330 are substantially narrower than the right side 190 and left side 180 respectfully. For this example, the lip 510 extends from both the bottom edge 340 of the first portion 130 and second portion 140 on each first end 320 and second end 330. The lip 510 extending perpendicular to the open side 102 a distance equal to or greater than the thickness of the gasket 360 and glass 700.

FIG. 5 is bottom view of the housing 100 with the gasket 360 laying on the sealing face 230, with the top gasket surface 370 contacting the sealing face 230, and the bottom gasket surface 380 being exposed and available for the sheet of glass 240 (not shown here). The possible air duct location 170 is approximately centered which is the preferred location. The first tab 280 protrudes out from the first portion 130 matching the angle of the left side 180, and second tab 290 protrudes out from the first portion 130 matching the angle of the right side 190. Each tab having a threaded hole 270, as does the second portion 140 and first portion 130. Internal fold seams 600 provide the connection between the first portion 130 to the center portion 120 and second portion 140 to the center portion 120.

The interior space 101 is defined by the center portion 120, first portion 130, and second portion 140 connect via internal fold seams 600. Internal fold seams 600 is one method of connection, other method may include pop rivets, welding the edges, or any other permanent fixation method.

In other embodiments, the first tab 280 protrudes out from the center portion 120 rather than the first portion 130, matching the angle of the left side 180, and second tab 290 protrudes out from the center portion 120 rather than the second portion 140, matching the angle of the right side 190.

In FIG. 6 is an exploded bottom view of the housing 100 with the gasket 360 laying on the sealing face 230, with the top gasket surface 370 contacting the sealing face 230, and the bottom gasket surface 380 being exposed and available for the sheet of glass 240 to rest upon. The exploded perspective provides a bottom view of how the components come together. The glass 240 having two sides, the inward glass surface 250 and the outward glass surface 260, the inward glass surface 250 lays against the top gasket surface 370 leaving the outward glass surface 260 available for first glass retention rail 400, second glass retention rail 410, third glass retention rail 420 and fourth 430 glass retention rail to lay along the perimeter as shown, compressively sealing the inward glass surface 250 to the top gasket surface 370 as the threaded fasters 470 and threaded thumb fastener 475 pass through the through holes 275 rotationally attaching in the threaded holes 270.

Figure 7:
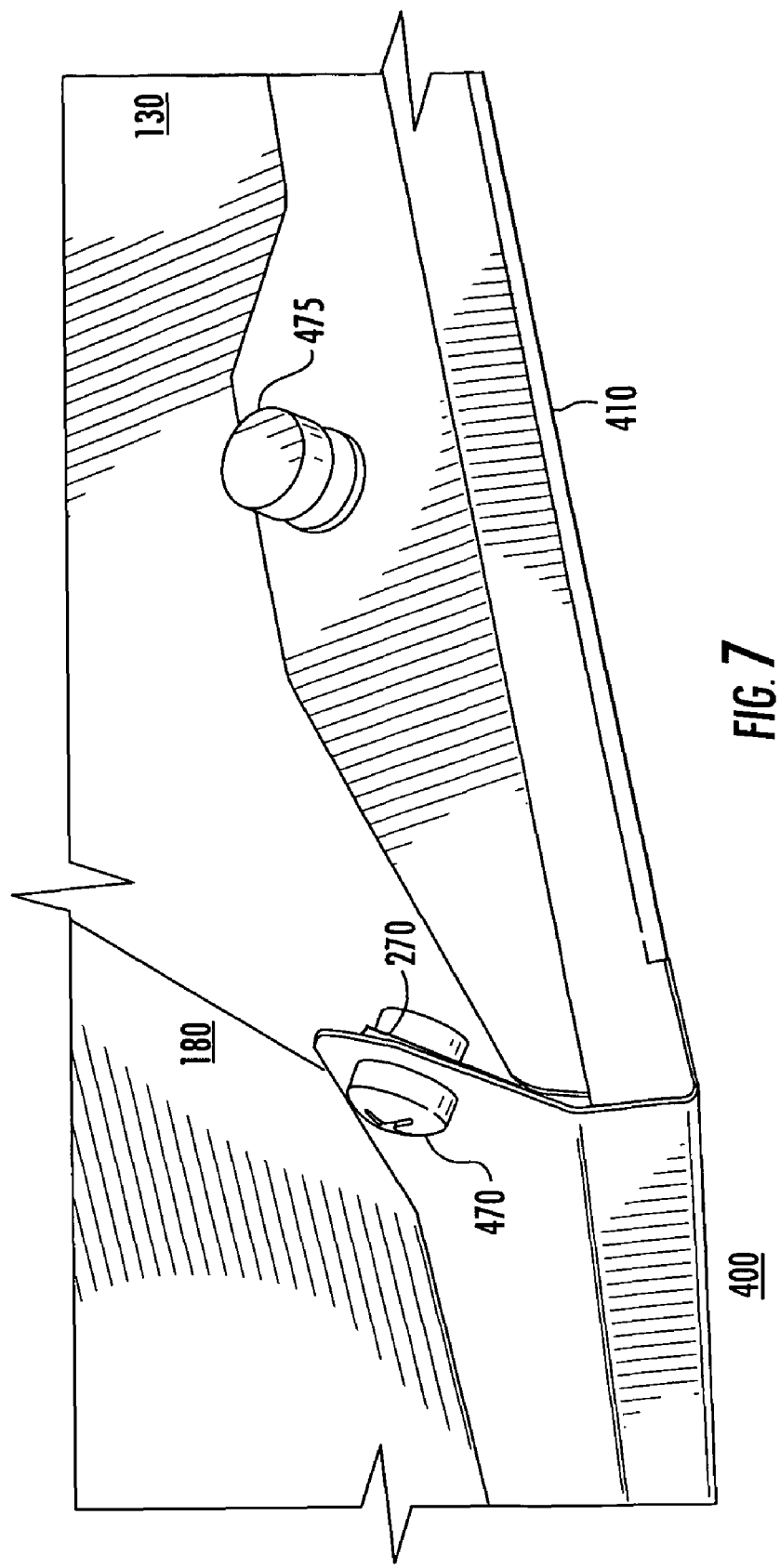
FIG. 7 is a close up perspective view of the left front corner of the housing with the glass retention rails attached by threaded fasteners of the embodiment shown in FIG. 1.

FIG. 7 is a close up perspective view of the first glass retention rail 400 and second glass retention rail 410 secured to the left side 180 and first portion 130 respectfully, with the threaded fastener 470 rotationally secured into the threaded hole 270 in first tab 280. Threaded thumb fastener 475 further rotationally secures to the first portion 130 by the same method.

Figure 8:
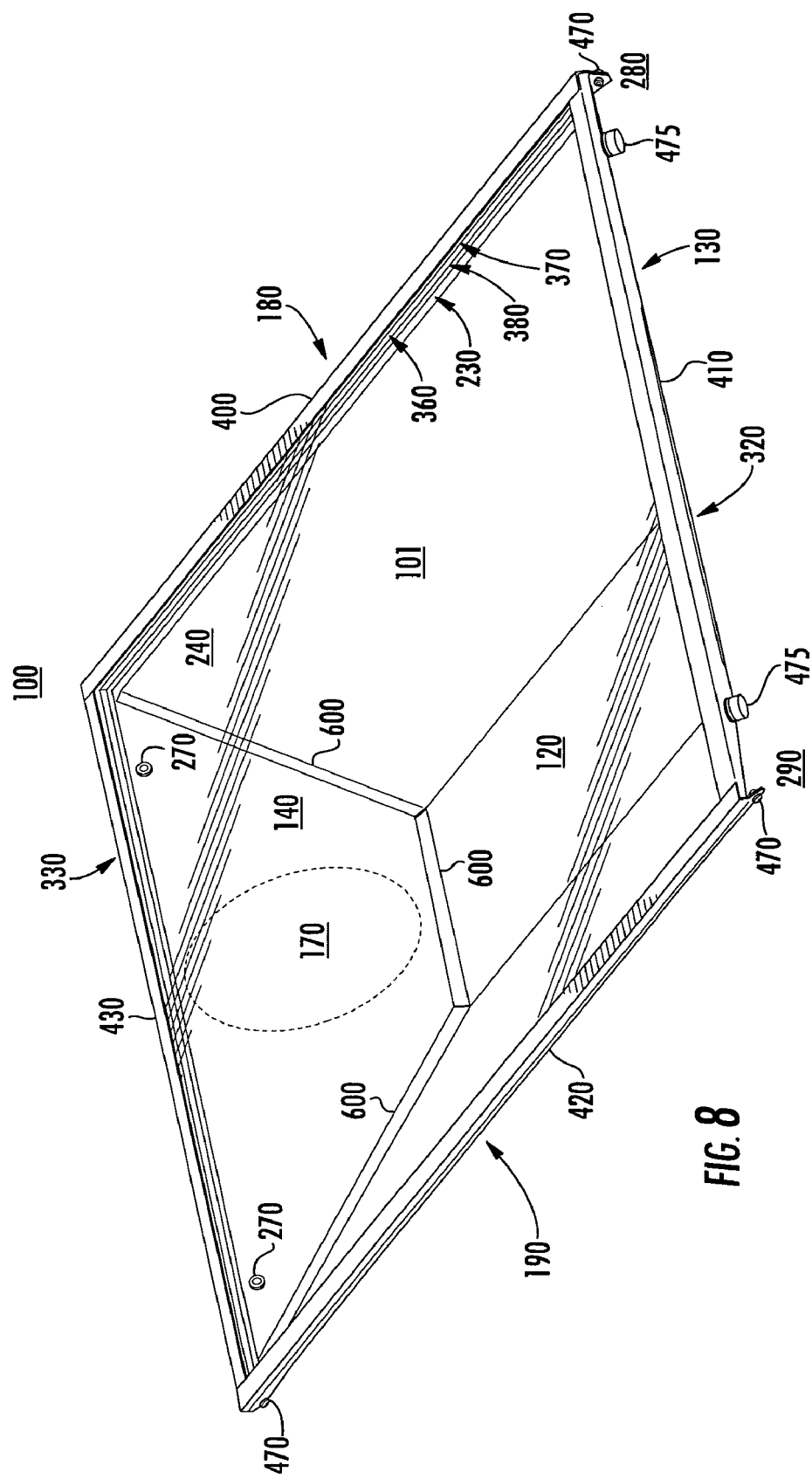
FIG. 8 is an assembled perspective bottom view of the housing, glass retention rails, and sheet of glass secured by threaded fastener, of the embodiment shown in FIG. 1.

FIG. 8 is bottom view of the housing 100 with the gasket 360 laying on the sealing face 230, with the bottom gasket surface 380 contacting the sealing face 230, and the top gasket surface 370 covered by the sheet of glass 240. The internal fold seams 600 attach the center portion 120, first portion 130, and second portion 140 to form the housing 100.

The first glass retention rail 400 compressively seals the glass sheet 700 and secured to the left side 180 by threaded fastener 470 rotationally secured into first tab 280 extending from first portion 130, and by threaded fastener 470 rotationally secured into third tab 300 extending from second portion 140, The third glass retention rail 420 compressively seals the glass sheet 700 and secured to the right side 190 by threaded fastener 470 rotationally secured into second tab 290 extending from first portion 130, and by threaded fastener 470 rotationally secured into fourth tab 310 extending from second portion 140. The second glass retention rail 410 compressively seals the glass sheet 700 and secured to the first end 320 by threaded fastener 470 rotationally secured into threaded hole 270 located in first portion 130. The fourth glass retention rail 430 compressively seals the glass sheet 700 and secured to the second end 330 by threaded fastener 470 rotationally secured into threaded hole 270 located in second portion 140.

We claim:

1. A horticultural lighting fixture comprising:
a housing, a gasket, a sheet of glass, four glass retention rails, and eight threaded fasteners;
the housing constructed from a center portion, a first portion, and a second portion, the housing defining an interior space therein and having an open side, the open side including a sealing face;
the first portion constructed from one continuous sheet of metal having two threaded holes including a first tab formed to match the angle of the right side and a second tab formed to match the angle of the left side, each tab having a threaded hole;
the second portion constructed from one continuous sheet of metal having two threaded holes with a third tab formed to match the angle of the right side and a fourth tab formed to match the angle of the left sides, each tab having a threaded hole;
the center portion constructed from a continuous sheet of metal, forming the left, right, and top sides of the housing, in connection with the first portion forming the first end, and the second portion forming the second end, leaving the open side at the bottom with the exposed edges of the center portion, first portion, and second portion defining the sealing face;
the gasket having a top and bottom surface, constructed in shape and size matching the sealing face, the bottom gasket surface sealingly mates to the sealing face;

the sheet of glass having an inward glass surface and outward glass surface, constructed in shape and size matching the gasket;

the first glass retention rail having a length matching the bottom edge of the first portion, having two through holes matching position of the first portion threaded holes, and formed into an L shape having the bottom of the L parallel with the outward glass surface and the top of the L matching the angle of the first portion;

the second glass retention rail having a length matching the bottom edge of the second portion, having two through holes matching position of the second portion threaded holes, and formed into an L shape having the bottom of the L parallel with the outward glass surface and the top of the L matching the angle of the second portion;

the third glass retention rail having a length matching the distance between the first tab and third tab, having a first through hole matching the position of the threaded hole of the first tab, and a second through hole matching the location of the threaded hole of third tab, and formed into an L shape having the bottom of the L parallel with the outward glass surface and the top of the L matching the angle of the right side;

the fourth glass retention rail having a length matching the distance between the second tab and third tab, having a first through hole matching the position of the threaded hole of second tab, and a second through hole matching the location of the threaded hole of fourth tab, and formed into an L shape having the bottom of the L parallel with the outward glass surface and the top of the L matching the angle of the left side;

the eight threaded fasteners of diameter and thread type matching the threaded holes, removably engage the first, second, third, and fourth glass retention rails to the housing, compressively securing the sheet of glass to the gasket, sealingly mating the inward glass surface to the top gasket surface.

2. A horticultural lighting fixture comprising:

a housing, a gasket, a sheet of glass, two glass retention rails, and four threaded fasteners;

the housing constructed from a center portion, a first portion, and a second portion, the housing defining an interior space therein and having an open side, the open side including a sealing face;

the sheet of glass having an inward glass surface and outward glass surface and of shape and size matching the sealing face;

the first portion constructed from one continuous sheet of metal having;

the second portion constructed from one continuous sheet of metal;

the center portion constructed from a continuous sheet of metal, forming the left, right, and top sides of the housing, in connection with the first portion forming the first end, and the second portion forming the second end, leaving the open side at the bottom with the exposed edges of the center portion, first portion, and second portion defining the sealing face;

the center portion having a first tab formed to match the angle of the right side and a second tab formed to match the angle of the left side, the first tab and second tab extending from the first end;

the center portion further having a third tab formed to match the angle of the right side and a fourth tab formed to match the angle of the left side, the first tab and second tab extending from the second end;

each first, second, third, and fourth tabs having a threaded hole;

the gasket having a top and bottom surface, constructed in shape and size matching the sealing face, the bottom gasket surface sealingly mates to the sealing face;

the sheet of glass having an inward glass surface and outward glass surface, constructed in shape and size matching the gasket;

the first glass retention rail having a length matching the bottom edge of the right side, having two through holes matching position of the threaded holes in the first tab and third tab, and formed into an L shape having the bottom of the L parallel with the outward glass surface and the top of the L matching the angle of the right side;

the second glass retention rail having a length matching the bottom edge of the left side, having two through holes matching position of the threaded holes in the second tab and fourth tab, and formed into an L shape having the bottom of the L parallel with the outward glass surface and the top of the L matching the angle of the left side;

the four threaded fasteners of diameter and thread type matching the threaded holes, removably engage the first and second glass retention rails to the housing, compressively securing the sheet of glass to the gasket, sealingly mating the inward glass surface to the top gasket surface.

3. A horticultural lighting fixture as defined in claim 1 and 2, wherein the sealing face is square.

4. A horticultural lighting fixture as defined in claim 1 and 2, wherein the sealing face is rectangular.

5. A horticultural lighting fixture as defined in claim 1 and 2, wherein the top gasket surface sealing mates to the sealing face with adhesive.

6. A horticultural lighting fixture as defined in claim 2, wherein the bottom edges of the first portion and second portion, includes a lip, parallel to the glass surface, protruding away from the housing, a distance equal to or greater than the thickness of the gasket and glass.

* * * * *